Feb. 28, 1939. C. W. GORDON 2,149,017
PROCESS OF SEPARATING SOLID MATTER FROM A LIQUID
Filed Nov. 27, 1936
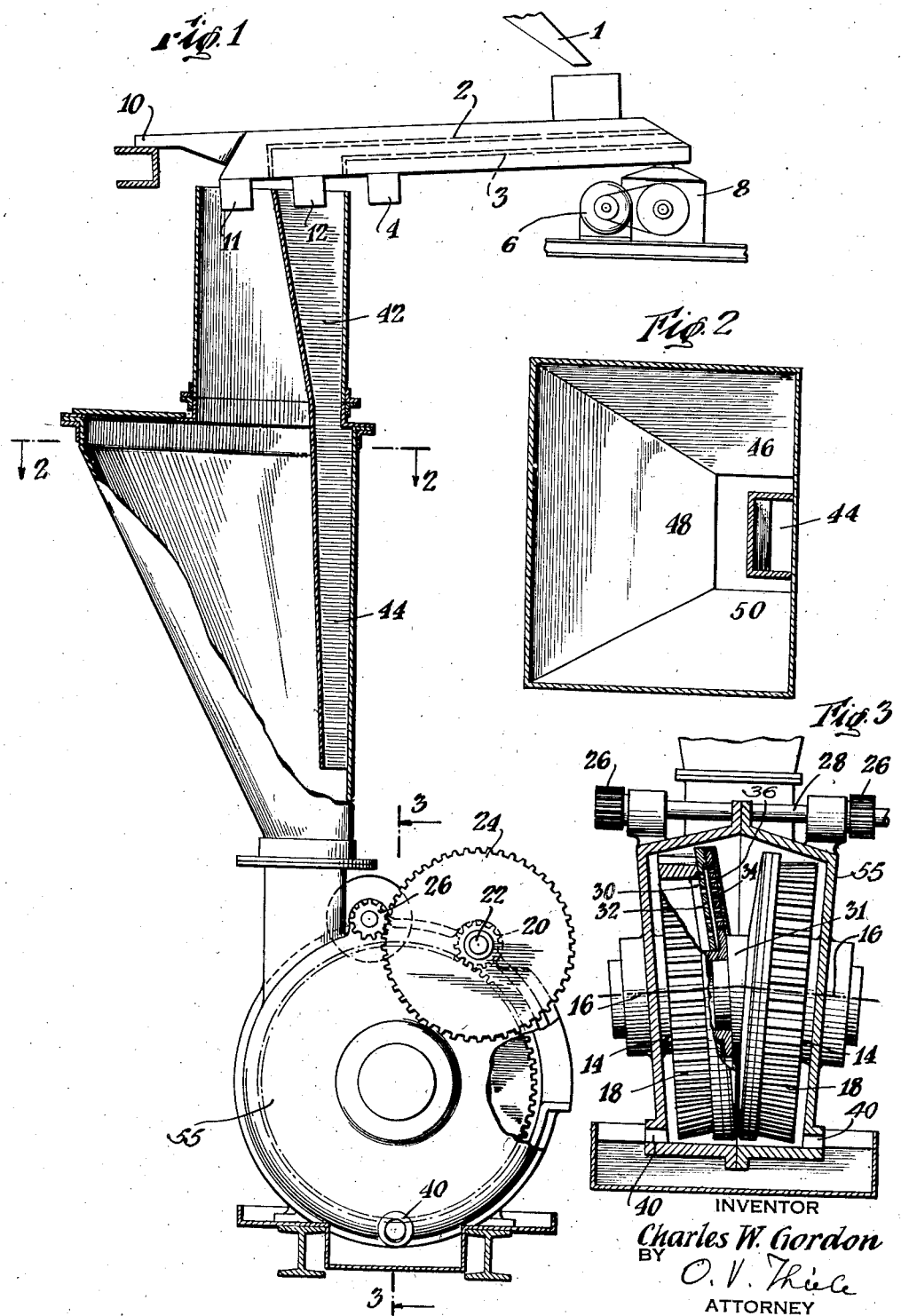
INVENTOR
Charles W. Gordon
BY
O. V. Thiele
ATTORNEY Patented Feb. 28, 1939

2,149,017

UNITED STATES PATENT OFFICE 2,149,017

PROCESS OF SEPARATING SOLID MATTER FROM A LIQUID

Charles W. Gordon, Munster, Ind., assignor, by mesne assignments, to Combustion Engineering Company, Inc., a corporation of Delaware Application November 27, 1936, Serial No. 113,023

4 Claims. (Cl. 100—38)

The present improvement relates to the art of screening solid materials, carried in suspension in a liquid, out of such liquid and forcing further liquid out of the screened solids, or "tails", by means of a press, and is more particularly concerned with cases where the solids carried in suspension are of varying sizes including very fine particles. A typical instance of this sort is that of distillery slop.

When such assorted sizes of materials are to be screened out of a liquid, it is found at once that to carry on the process at a reasonable speed and in such a way that the filtered material comes from the filter without excessive moisture, it is practically necessary to filter through two or more screens of different number of mesh. A practical installation may for example use two screens, the slop being fed in the first place on a 30 mesh per inch screen, the effluent from this filter being run on to a filter of 200 mesh per inch. If a single 200 mesh filter were used and all of the slop fed directly to it, the action would be slowed up very much and the material screened out would come from the filter very much wetter than when the two mesh filter referred to is used. The reason for this is that in the former case the fine material is intimately mingled with the coarser material, closing up the interstices between the coarser particles so that the drainage through the mass is nearly as slow as if the whole mass were made up of fine particles. If however the coarser particles are filtered out first, then the drainage through this portion of the mass is very much more rapid and thorough, and the portion of the mass in which the filtration is slow and not very thorough is reduced to a minimum. The total moisture retained by the two masses is as a consequence much smaller than with a single fine mesh filter. In the case of distillery slops, the relative proportions of the two masses will be, for example, as follows: The 30 mesh screen may retain approximately 10 lbs. of wet filtrate per bushel of slop processed and the 200 mesh screen may retain approximately 2 lbs., the ratio thus being 5 to 1.

The moisture content of the filtrate is in any case such that a great portion of it can be removed by a suitable press. If, as is regular practice, the filtrate from the 30 mesh filter is mingled with that from the 200 mesh and the resulting mixture put through a press, it is found that the effluent carries an entirely too large proportion of the fines with it.

The object of the present invention is to remedy this condition by providing a novel process and apparatus for treating the wet material coming from the filter. When this novel process is used, it will be found that in addition to reducing the amount of fine material carried off by the effluent a further benefit results which is that a much drier solid product from the press can be obtained than could be obtained from such a pressing operation as practiced heretofore.

The invention is illustrated in, and will be discussed in connection with, the drawing on the single sheet filed herewith in which Fig. 1 shows a lateral elevation, partly in section, of an installation utilizing the improved process and apparatus. Fig. 2 is a sectional view on line 2—2 of Fig. 1 and Fig. 3 is a sectional view on line 3—3 of Fig. 1.

The material to be treated is fed to the filter through the spout 1. It falls on the 30 mesh screen 2 where a substantial part of the solid particles are retained. As mentioned above, this may be about 80 to 90% of the total. The water flowing through the screen and carrying the finer particles with it falls upon the 200 mesh screen 3. This retains all of the suspended solids left which it is practically advisable to filter out. The effluent falls to the bottom of the screen housing and flows down to the outlet trough 4.

The type of screen illustrated in the drawing is a well known commercial type which gives a horizontal rotary motion to one end of the screen, the power being furnished by a motor 6. The mechanism for giving this motion is indicated at 8. The opposite end 10 of the screen is guided to give this end a reciprocating movement. The screen is inclined and the whole arrangement is such that the material caught on screens 2 and 3 is gradually fed down toward the lower or left end and is discharged at 11 and 12 respectively. The particular type of screen or its action are not per se a part of the present invention and any device that separates the grain as indicated will answer the purpose.

The press itself which I utilize is likewise of a commercially available type. It may briefly be described as follows: Within the casing 55 two discs 14—14 are mounted to rotate about their axes 16—16, being driven by means of the circumferentially arranged gear teeth 18—18 engaging the spur gears 20. These spur gears are each mounted on an axle 22, and on each axle 22 there is mounted a gear wheel 24, which are driven by the spur gear 26. These spur gears 26—26 are mounted on shaft 28, which is driven by any suitable means.

It will be noted that the axes 16—16 are inclined away from the horizontal in opposite directions and that the faces 30 of the discs 14 are frusto-conical. Each surface 30 is perforated as indicated at 32 and has mounted on it a perforated plate 34. This in turn has mounted on it a screen cloth 36. The openings in the disc 30 and in the plate 34 are fairly large and readily allow anything to flow away through them which is passed by the screen cloth 36. The screen cloth has rather fine perforations, these being in practice about a millimeter in diameter.

It will be noted that the two conical surfaces are very close to each other and that elements of the opposed portions of the conical surfaces are parallel to each other in the region vertically below the center and diverge at the region directly above the center. At intermediate points they approach each other more and more closely as the lowest point is approached.

This press is, as stated, a commercially available one and operates briefly as follows: Material to be pressed is fed in from above and at one side of the axes 16—16. As the discs are rotated, this material is carried downward toward the lowest point, the space available for it becoming more and more restricted, with the result that its moisture is pressed out through the cloth. This moisture then leaves through the perforations in the plates and flows downward and is discharged at 40.

Under prior practice the material from the 30 mesh and that from the 200 mesh screens were fed into the press together and mingled, with the result, pointed out above, that a great proportion of the fines was pressed out through the screen cloth.

The perforations through the screen cloth are of such size that the screen cloth retains substantially all of the coarser material but rather readily passes material of the size caught by the 200 mesh filter. The perforations cannot be made smaller without seriously interfering with the flow of the liquid through the cloth.

By my improved device and in accordance with my improved process I feed the fine material into the press in such a manner that it is surrounded by coarser material on all sides. From Figs. 1 and 2, for example, it will be clear that the fine material from 12 falls into the funnel-shaped entrance 42 which delivers it through the channel 44 to the press, surrounded on three sides at 46, 48 and 50 by coarser material from the 30 mesh filter 2 coming in through the spout 11. The fourth side need not be closed in with the coarser material in this particular press, as the material here does not lie against screen cloth, but against the solid hub 31. As a result the fine material nowhere comes in contact with the screen cloth 36, through which it might pass. Particles of this fine mass may be carried a little distance into the coarser material but will be caught by such coarser material and held and kept from reaching and penetrating this screen cloth.

Inasmuch as the finer material is prevented from reaching the screen cloth and from being carried along by the liquid which has been pressed out and forced through the screen cloth, it is now found that a much higher pressure can be applied in the press. Another factor enters here to make the application of higher pressures possible when the present process is used. It is possible to apply pressure to masses of such granular material generally only because there is frictional resistance to movement of the particles over each other. The more of this frictional resistance exists, the higher the pressures that can be applied. Now the very fine particles where they are present act in the nature of a lubricant and by segregating them and putting them in the central area, this lubricating action is removed. With the present process the pressure may be raised from 50 to 60 pounds per square inch to 125. The cake coming from the press is therefore very much drier and this is a great advantage when the material is to be dried further, as is usually the case, such further drying being performed by evaporation and therefore being relatively expensive.

The nature of the invention will be clear from the above and it will be likewise clear that the application of the inventive idea is not limited to any particular form or type of press. In fact, the invention can obviously be used equally well in connection with a centrifuge. All that is required to take advantage of the invention is that the coarser material from the 30 mesh screen be interposed between the mass of finer particles and every surface by which the moisture forced out leaves the press.

While I have described the invention in the above with particular reference to distillery slops and have mentioned particular sizes of particles, filter screens and press screens, it will be understood that this is not intended in any way as a limitation but merely by way of illustration. It will likewise be obvious that many variations can be made in the particular apparatus described without departing from the inventive thought.

What I claim is:

1. The process of removing liquid from wet granular material comprising the steps of draining the free inter-granular liquid off from the material, separating the material into two portions, one of which contains substantially all the grains below a predetermined size and the other of which contains all the remaining grains, placing a layer of the latter portion in contact with the screen of a press, placing the former portion on said layer, and pressing further liquid other than intergranular liquid out of the material by mechanically pressing the two layers against the press screen with considerable force.

2. The process of removing liquid from wet granular material comprising the steps of draining the free inter-granular liquid off from the material, separating the material into two portions one of which contains substantially all the grains below a predetermined size and the other of which contains all the remaining grains, feeding the material to a press in such a manner that the former portion is everywhere separated by a layer of the latter portion from the surfaces of the press through which the liquid flows which is forced out by the press, and applying relatively great pressure by the press to the material, thereby pressing out of the mass any residual intergranular liquid and further liquid from within the grains.

3. The process of removing liquid from wet granular material comprising the steps of draining the free inter-granular liquid off from the material, separating the material into two portions one of which contains substantially all the grains below a predetermined size and the other of which contains all the remaining grains, feeding the material to a press in a stream of which the former portion forms a core surrounded by an enveloping layer of the latter portion, and exerting relatively great pressure on the mass, whereby there is removed any residual intergranular liquid and further liquid from within the grains.

4. The process of removing liquid from wet granular material comprising the steps of draining the free liquid off from the material, separating the material into two portions one of which contains substantially all the grains below a predetermined size and the other of which contains all the remaining grains, feeding the two masses into a pressing device having screen surfaces with openings through which grains below said size could pass but through which substantially no grains above said size can pass, the material being fed in so that a layer of the second portion everywhere separates the first portion from the screen surface, and forcing the material toward the screen surface with relatively great force.

CHARLES W. GORDON.